United States Patent [19]

Farley

[11] 4,379,483
[45] Apr. 12, 1983

[54] METHOD OF CONTROLLING HEATING AND COOLING SOURCES

[75] Inventor: Scott R. Farley, Wichita, Kans.

[73] Assignee: The Coleman Company, Inc., Wichita, Kans.

[21] Appl. No.: 293,185

[22] Filed: Aug. 17, 1981

[51] Int. Cl.³ .......................... F25B 29/00; F25B 7/00
[52] U.S. Cl. .......................................... 165/2; 62/175; 165/29; 236/1 EA; 307/39
[58] Field of Search ............ 236/1 EA, 78 D; 62/175, 62/160; 165/29, 26, 2; 307/39; 364/557, 141

[56] References Cited

U.S. PATENT DOCUMENTS

| | | | |
|---|---|---|---|
| 3,513,662 | 5/1970 | Golber | 62/175 X |
| 4,152,902 | 5/1979 | Lush | 62/175 X |
| 4,265,298 | 5/1981 | Sumner, Jr. et al. | 165/2 |
| 4,265,299 | 5/1981 | Harnish | 165/29 X |
| 4,270,693 | 6/1981 | Hayes | 236/46 F |
| 4,298,056 | 11/1981 | Nelson | 165/29 X |
| 4,298,946 | 11/1981 | Hartsell | 364/557 |
| 4,325,224 | 4/1982 | Howland | 236/1 E |

Primary Examiner—William E. Wayner

[57] ABSTRACT

A method of controlling heating and cooling sources utilizes a computer or an electronic thermostat to control a plurality of heating or cooling resources for regulating indoor temperature within a narrow temperature range. The method maintains a temperature within the control range by activating a required number of heating or cooling sources and proportionally controlling one of the sources within the control range. An additional heat source is activated each time the indoor temperature falls below a preset "add heat" temperature, and a heat source is deactivated each time the indoor temperature passes a preset "delete Heat" temperature. Similarly, when the method is operating in the cooling mode, an additional cooling source is activated when the indoor temperature passes an "add cooling" temperature, and an additional cooling source is deactivated each time the indoor temperature passes a "delete cooling" temperature.

7 Claims, 12 Drawing Figures

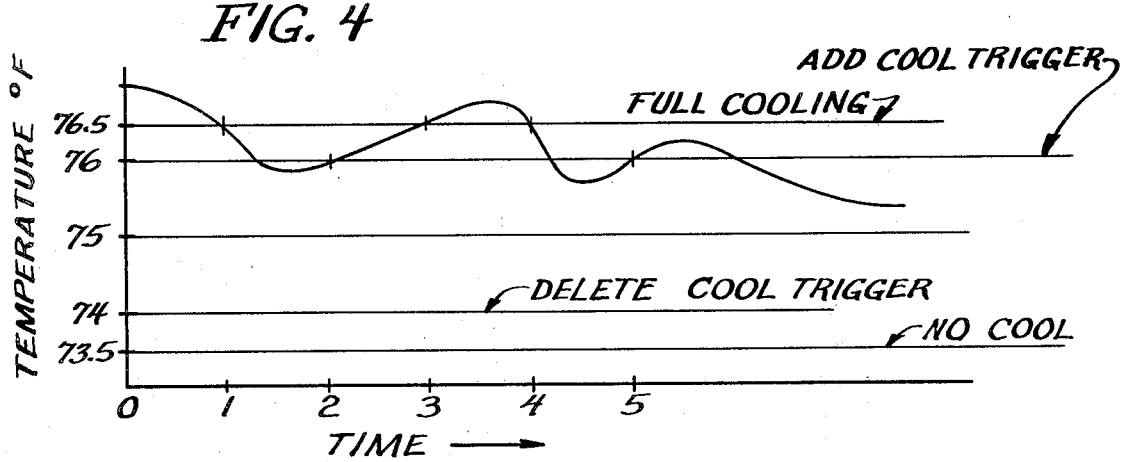

METHOD OF CONTROLLING HEATING AND COOLING SOURCES

BACKGROUND OF THE INVENTION

The invention relates to a temperature control system and, more particularly, to a temperature control system which is capable of controlling temperatures within a selected temperature band when a number of heating or cooling sources are used.

A conventional multi-stage heating system initially draws all heating requirements from a single source by switching that source "on" while maintaining the other heating sources in the "off" position. In a two-stage heating system which utilizes a heat pump and an electrical resistance heater, the initial source of heat is usually the heat pump because it is more efficient than its companion electrical resistance heater. When the initial source or heat pump is no longer capable of supplying the heat demanded, the second source is activated to provide additional heating to the system. When the additional stage or heat source is no longer needed, that stage is turned off. A heating system with three or more stages operates in a similar manner. The heating sources are sequentially activated or deactivated depending upon the ambient conditions.

A conventional multi-stage system uses a separate thermostat for each heat source or stage. Each thermostat is set at a different temperature range so that the staged heat sources turn on at successively lower temperatures. A typical mercury thermostat has a temperature sensing range of about 1½° F., and the thermostats are placed about 1° apart. Accordingly, a two-stage unit would have a control range of 4°, without considering drop. A three-stage unit would have a control range of about 6½. These relatively wide temperature ranges can cause inefficient energy use and user discomfort. In addition, wide temperature variations may necessitate frequent manual resetting of the temperature control.

Recent efforts to achieve increased energy efficiency have rekindled interest in the proportional control of heating and cooling systems. A multi-stage thermostat is used in proportional control systems and is a limiting factor in the number of stages employed.

SUMMARY OF THE INVENTION

The method of this invention overcomes the aforementioned limitations by allowing many stages to overlap each other in temperature range. The stages are time separated, in that only one stage is proportionally controlled at any one time. The other stages are locked "on" or "off" to supplement the proportionally controlled stage. The method uses only a single thermostat and therefore avoids the wide band of temperature ranges created by conventional multi-stage thermostat systems.

The method initially draws all heating requirements from a predetermined single heat source by proportionally controlling the source in order to maintain a constant temperature. When the first heat source is no longer capable of supplying the heat demanded, the first heat source is switched to a continuous "on" mode, and a second heat source is proportionally controlled to the same set point to which the first source was controlled. This process of switching the proportionally controlled heat source to a full "on" mode and modulating the next additional heating source continues until no additional heating sources are available or until a sufficient amount of heat is being delivered to maintain the indoor temperature within a desire temperature range. As the outdoor temperature rises, the process reverses itself through each stage.

In addition, the method can automatically switch from a heating mode to a cooling mode and vice versa. This is very useful in climates where relatively large temperature changes can occur over short periods of time. Finally, the method has a cost and reliability advantage in that relatively low-cost, off-the-shelf computer components are used.

DESCRIPTION OF THE DRAWINGS

FIGS. 2-4 are graphical depictions of how the invention controls and reacts to temperature changes;

FIGS. 5-8 illustrate the function of the proportional selector feature of the invention;

GENERAL DESCRIPTION OF THE INVENTION

Figure 1:
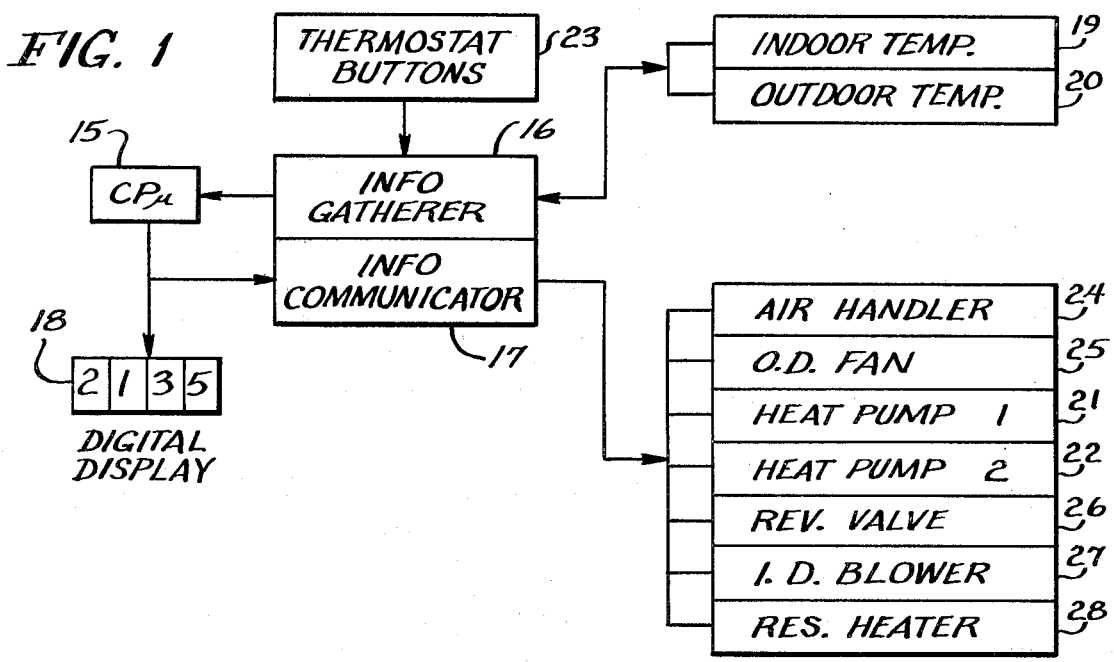
FIG. 1 is a schematic illustration of a computer-controlled system for controlling a plurality of heating and cooling sources.

Referring to FIG. 1, a computer or microprocessor 15 receives input from an information gatherer 16 and provides output to an information communicator 17 and a digital display device 18. The information gatherer 16 receives information or input signals from an indoor temperature sensor 19, an outdoor temperature sensor 20, and thermostat setting buttons 23. The information communicator 17 delivers information or output signals to an air handler 24, an outdoor fan 25, the first heat pump 21 (H1), the second heat pump 22 (H2), a reversing valve 26, an indoor blower 27, and a resistance heater 28 (H3).

The various components illustrated in FIG. 1 are conventional and well known in the art, and a detailed description thereof is unnecessary. The invention does not relate to the details of the particular components illustrated but rather to the way in which these components are controlled to regulate the indoor temperature of a building.

The computer or microprocessor 15 is programmed or wired so that the heat pumps and the resistance heater are activated as the indoor temperature passes through certain preset temperature settings. These temperature settings are fed into the computer by the thermostat setting buttons 23. The thermostat setting buttons 23 include buttons for indicating the various temperature triggers which will be described hereinafter and 10 buttons for digits 1 through 0 for setting the desired numerical value of the temperature at each temperature trigger. The numerical valves are displayed by the digital display 18.

Figure 2:
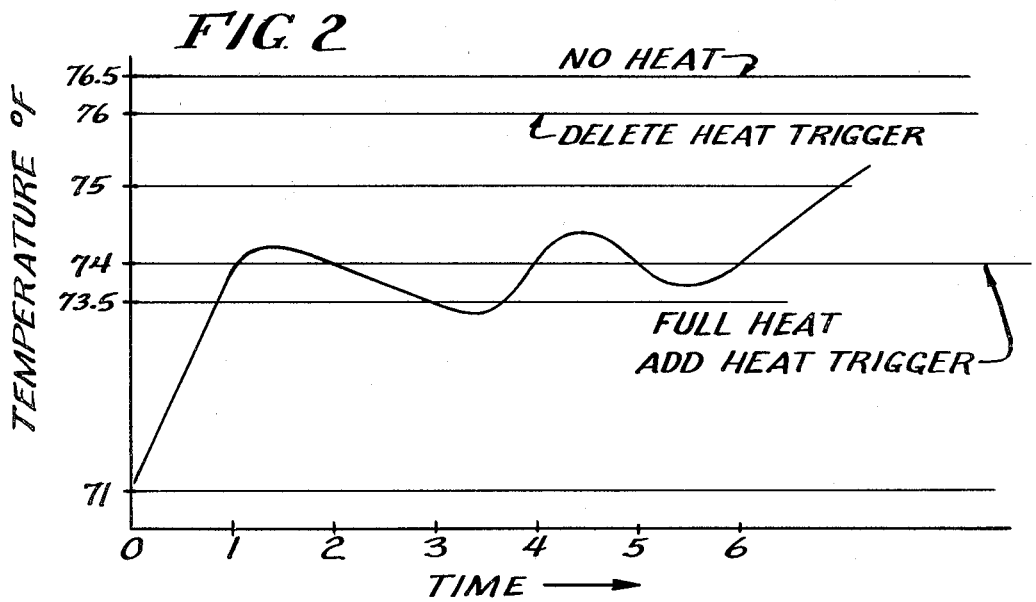

FIG. 2 illustrates how the method reacts to temperature changes and controls heat sources in the heating mode. The graph is depicted in terms of house or indoor temperature versus time.

In the embodiment illustrated, an indoor set temperature of 75° F. is fed into the computer by the push buttons 23. The computer is programmed to set 74° F. as the "Add Heat Trigger" temperature and 76° F. as the "Delete Heat Trigger" temperature. The computer also sets 73.5° and 76.5° as the Full Heat and No Heat temperatures, respectively. The 2° range between 74° and 76° is the proportional control range, and the upper and lower limits of this range vary with the indoor set temperature. For example, for an indoor set temperature of 70°, the Add Heat trigger temperature will be 69° and the Delete Heat Trigger temperature will be 71°. The Full Heat and No Heat temperatures will be 68.5° and 71.5°, respectively.

When the heating system is initially activated at Time 0, the indoor temperature is 68°. Since the temperature is below 73.5°, the "Full Heat" mode of the system turns on all heating sources, H1, H2, and H3. The heating sources remain on as the indoor temperatures passes 73.5°. When the temperature reaches 74° (Time 1), which is also set as the "Heat Off" temperature as the temperature rises, all heating sources are shut off. The indoor temperature continues to rise for a period of time and overshoots 74° before the temperature begins to decline. As the temperature passes back down through 74°, which is the "Add Heat Trigger" temperature (Time 2), a first heating source, H1, is transferred from the "off" mode to the proportional controller mode. In the proportional control mode, the computer is programmed to modulate a heating source between the 74° and 76° range (the thermostat being set at 75°). Since the indoor temperature is now below 74°, H1 is turned on by the proportional controller.

If H1 is not sufficient to keep the house warm, the temperature continues to fall until it once again passes below 73.5° (Time 3), and the Full Heat demand activates all of the heating sources. All of the heating sources remain on until the 74° level is again reached (Time 4), at which time all the heating sources except H1 (which is still on proportional control) are turned off. The temperature again overshoots 74° before it begins to fall. When the temperature does fall past the 74° "Add Heat Trigger" at Time 5, two things occur. H1, which was on proportional control, is switched by the computer to the locked on or continuous "on" mode. Also, the second heating source, H2, is transferred by the computer from the "off" mode to the proportional control mode. H2 is turned fully on by the proportional controller because the indoor temperature is below 74°. If we assume that heat resources H1 and H2 combined are more than adequate to maintain a temperature of 75°, the indoor temperature will rise until the 74° level is reached at Time 6. As the temperature further increases, the proportional controller feature of the computer modulates the heating output of H2, while H1 remains in the locked-on mode. The combined heating sources stabilize the indoor temperature in the 74°–76° control range. All other unneeded heating sources remain off.

Figure 3:
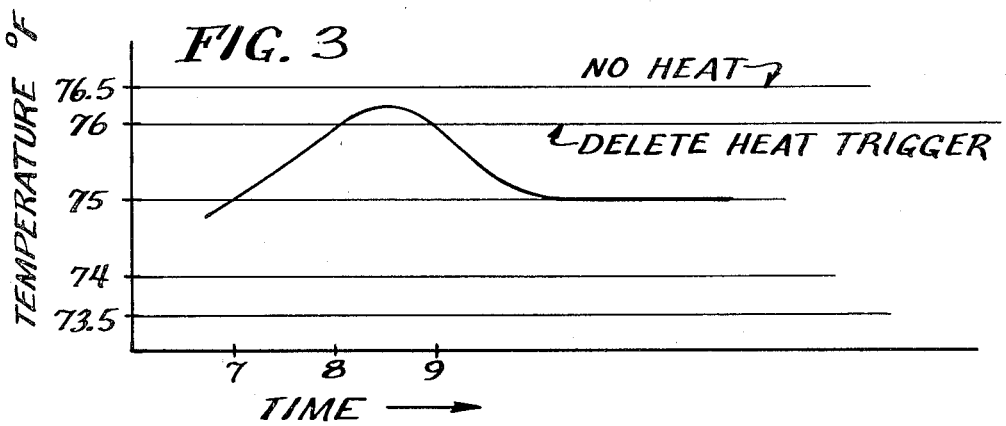

When the outdoor temperature changes, the system reacts accordingly. If at Time 7 (FIG. 3) the outdoor temperature were to rise, the proportional controller would continue to modulate the output of H2. This monitoring would continue until the indoor temperature rose above the "Delete Heat Trigger" at 76° (Time 8), at which time the computer would transfer H2 to an off mode and would transfer H1 from the locked-on mode to the proportional control mode. If the temperature continued to increase and passed the 76.5° "No Heat" temperature, H1 would also be shut off. The proportional controller would begin to modulate H1 to maintain the temperature between 74° and 76°. If the outdoor temperature continued to rise, the indoor temperature would again rise past the 76° Delete Heat trigger, and the computer would transfer H1 from the proportional control mode to the "off" mode.

Referring again to Time 7, in FIG. 3, if the outdoor temperature were to decrease, the proportional controller would continue modulating H2 until the indoor temperature dropped below the 74° "Add Heat Trigger." H2 would then be transferred by the computer from the proportional controller to the locked-on mode, and a third heating source, H3, would be transferred to the proportional controller. Since the temperature is below 74°, the proportional controller would turn H3 fully on until the indoor temperature rose above 74°. Thereafter the proportional controller would begin modulating the output of H3.

Other heating sources could also be added to the system if desired. Each heating source would be consecutively turned over to the proportional controller as the previous heating source was handed to the locked-on mode by successive temperature fallings through the Add Heat Trigger of 74°.

The Delete Heat Trigger of 76° has the opposite effect of the Add Heat Trigger. Successive temperature risings past the Delete Heat Trigger will cause the heat source which is being modulated by the proportional controller to be transferred to the off mode, and the next heat source would be transferred from the locked-on mode to the proportional controller.

If at any time the temperature were to dramatically rise past the 76.5° "No Heat" trigger, all heating sources would be turned off.

The computer or microprocessor 15 can be programmed by conventional programming methods so that the various temperature triggers can be inputted to the computer for controlling the heat sources. The proportional control mode is controlled by the computer by programming the computer so that it turns the proportionally controlled heat source on and off to maintain the indoor temperature within the proportional control range of 74° to 76°.

Cooling can be controlled by the computer in an analoguous manner. In the cooling mode, the first and second heat pumps are operated as first and second cooling sources C1 and C2. Referring to FIG. 4, a desired indoor temperature of 75° in the cooling mode is inputted to computer by the thermostat buttons 23, and the computer program sets 76° and 74° as the "Add Cool Trigger" and "Delete Cool Trigger" temperatures, respectively, The program also sets 76.5° as the Full Cooling temperature and 73.5° as the No Cool temperature. The various temperature levels function as follows:

| | |
|---|---|
| 76.5° | Full Cooling. |
| 76° | Add Cool Trigger (Moves one cooling resource to the proportional controller. If a cooling resource is locked-on proportional control, that resource is transferred to the on mode.) |
| 74° | Delete Cooling Trigger (Moves one cooling source away from the proportional controller to the off mode. The next cooling source is |

| | |
|---|---|
| | transferred from the locked-on mode to the proportional controller.) |
| 73.5° | No Cooling. |

Once again, the 74°-76° range is the proportional control zone. If the house temperature is above 76.5°, the Full Cooling trigger turns all cooling resources on (Time 0 in FIG. 4). The temperature falls to 76°, all cooling resources are turned off (Time 1). The temperature overshoots 76° on the way down, and when the temperature rises past the Add Cool Trigger at 76° (Time 2), the first cooling resource C1 is handed to the proportional controller and turned fully on because the temperature is above 76°. If C1 is not sufficient to keep the house cool, all cooling resources will be turned on when the temperature rises above 76.5° (Time 3) and will stay on until the temperature again falls to 76° (Time 4). As the temperature again rises past the Add Cooling Trigger at 77°, (Time 5), C1 is transferred to the locked-on mode, and C2 is handed to the proportional controller.

The 74° level acts as a Delete Cool trigger in the same manner that 76° acted as a Delete Heat Trigger. Successive temperature fallings past 74° will transfer cooling resources from the locked-on mode to the proportional controller and then to the off mode. The 73.5° level acts as a No Cool trigger, turning all cooling sources off.

FIGS. 5-8 illustrate three heat resources and three cooling resources, which could all be provided by three heat pumps. The arrow represents the proportional selector feature of the invention and points to the resource currently on proportional control. If the arrow points to 0 (as in FIG. 5) or to one of the heat resources, the computer program locks cooling out. Successive temperature fallings past the Add Heat Trigger at 74° will increment the arrow to the left. Referring to FIG. 5, if the temperature is below 73.5°, Fall Heat demand will turn on all heat resources. The first temperature falling past 74° after overshoot (Time 2 in FIG. 2) will move the arrow one position to the left to H1 (FIG. 6). H1 is now operated by the proportional controller.

The next temperature falling past 74° (Time 5 in FIG. 2) moves the arrow one more position to the left to H2 (FIG. 7). H2 is now operated by the proportional controller and H1 is turned over to the full or locked-on mode.

The arrow is moved to the right by successive temperature risings past 76°. Three of these events, caused by the outdoor temperature warming up to, e.g., 85°, would move the arrow to C1 (FIG. 8). In this position C1 would be operated by the proportional controller, C2 and C3 would be off, and all of the heat resources would be off.

A computer-controller system has the advantage of variability, since many combinations of temperature control levels can be inputted to the computer by the thermostat setting buttons 23. For example, the computer can be set for the following temperature limits:

| | |
|---|---|
| Cooling Discomfort (economy operation) | 85° |
| Cooling Comfort (normal operation) | 78° |
| Heating Comfort (normal operation) | 72° |
| Heating Discomfort (economy operation) | 65° |

The Cooling Comfort level is the temperature which is selected for initiating cooling during waking hours, and the Heating Comfort level is the temperature which is selected for initiating heating during waking hours. The range between 72° and 78° is a "dead band" range, and no heating or cooling occurs within this range.

The Cooling Discomfort level is the temperature which is selected for initiating cooling during sleeping hours or during the periods when the dwelling is unoccupied. This is the temperature which is selected by the occupant at which he will become uncomfortable even during sleeping. The Heating Discomfort level is the temperature which is selected to initiate heating during sleeping hours or when the dwelling is unoccupied. This is the temperature at which the occupant will become uncomfortable even during sleeping. The system is set for economy operation during the hours at which the system is controlled by the Heating and Cooling Discomfort levels. In other words, the dead band range during these periods is widened to the 20° range between 65° and 85°.

The temperatures and times for the various levels can be inputted to the computer by the thermostat setting buttons 23.

The dead band range is particularly advantageous when the system is set for automatic changeover from heating to cooling. The variations in the outdoor temperature throughout the day might be sufficient to vary the indoor temperature from, e.g., 65° to 80°. The system is shut off while the indoor temperature is within the dead band range from 72° to 78°, thereby saving energy.

The dead band range can be varied as desired by inputting the information to the computer by the setting buttons 23. The dead band can be reduced to zero if desired, for example in a restaurant, so that the indoor temperature will remain substantially constant.

DESCRIPTION OF ELECTRONIC THERMOSTAT

The preferred embodiment of the invention uses a computer or microprocessor which is programmed to control the heating and cooling resources in the manner previously described. However, the heating and cooling resources can also be controlled by an electronic circuit. In this embodiment two cooling resources and three heating resources are used:

| | |
|---|---|
| C2 | 24,000 BTU air conditioner |
| C1 | 12,000 BTU air conditioner |
| H1 | 12,000 BTU heat pump |
| H2 | 24,000 BTU heat pump |
| H3 | 15,000 BTU electrical resistance heater |

Figure 11:
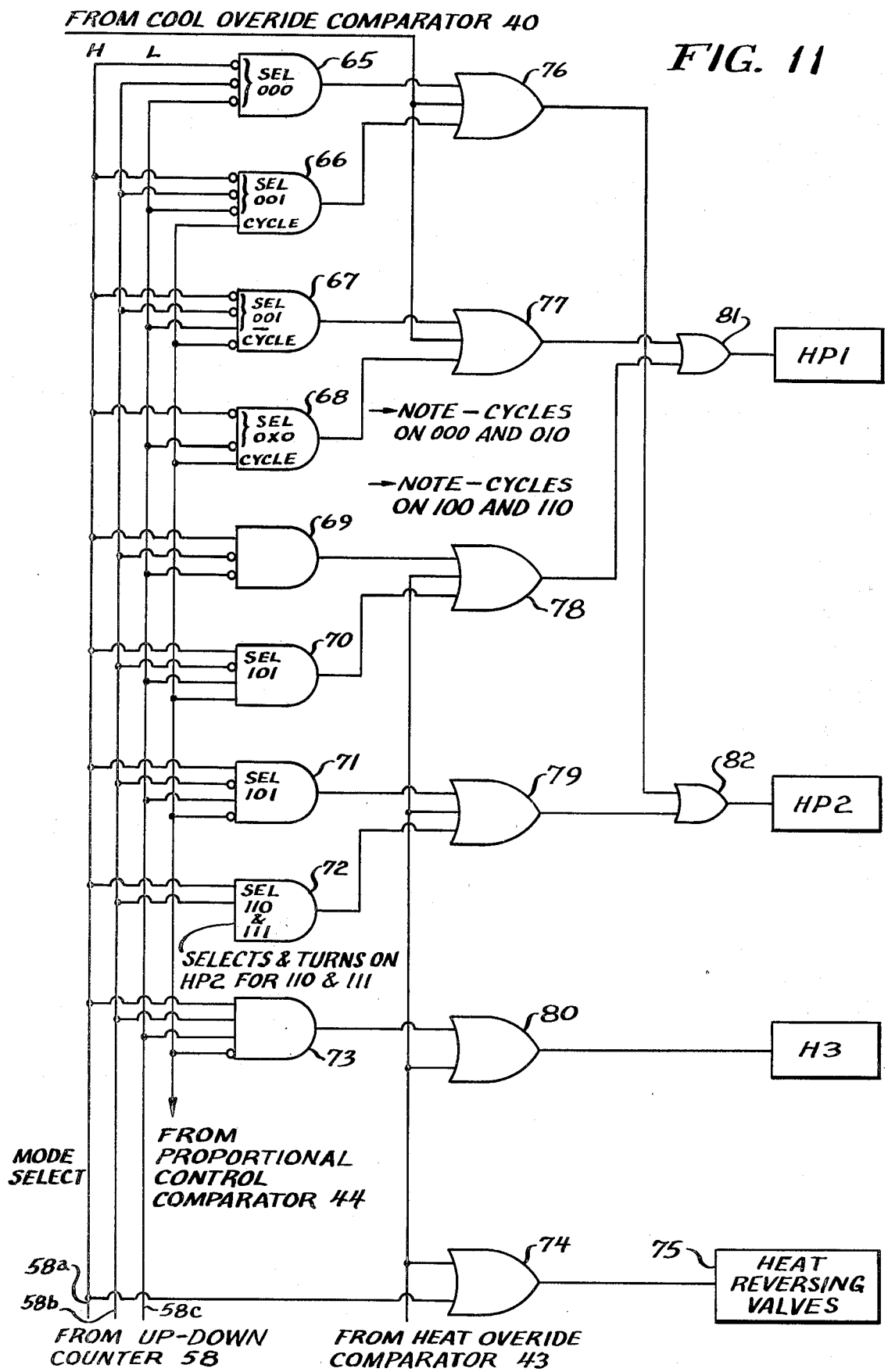
FIG. 11 is a logic diagram of the electronic thermostat for controlling the individual heating and cooling sources.

C1 and H1 can be provided by one heat pump HP1 (see FIG. 11), and C2 and H2 can be provided by a second heat pump HP2 (FIG. 11). Three capacities can be generated from C1 and C2 (or from H1 and H2):
Capacity 1—12,000 BTU (C1)
Capacity 2—24,000 BTU (C2)
Capacity 3—36,000 BTU (C1 and C2)

Still another capacity can be obtained by alternately switching C1 and C2 to the proportional controller. When C2 is on, C1 is off, and vice-versa. This produces an intermediate capacity between the two resources (18,000 average BTU).

Figures 9, 12:
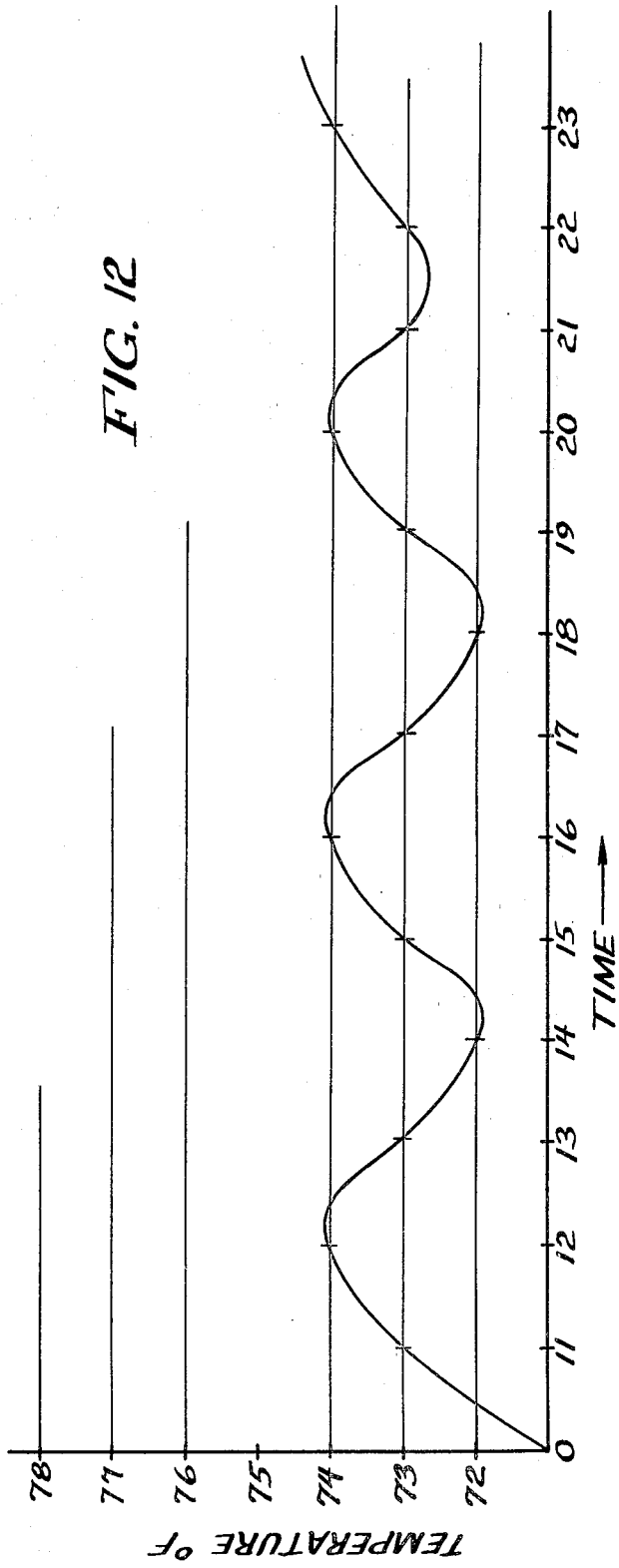
FIG. 9 is a binary truth table representation of the logic diagram of FIG. 11.
FIG. 12 is a graphical depiction of the operation of the thermostatic system of FIGS. 10 and 11.

The position of the proportional controller (represented by the arrow in FIGS. 5-8) is controlled by a three digit binary number, which provides eight positions or stages represented in the truth table of FIG. 9. The truth table uses the following designations:

| | |
|---|---|
| ON | The resource is in the on mode. |
| CYC | The resource is being cycled by the proportional controller. |
| CYC ⟵⟶ CYC | Two resources are being interchanged by the proportional controller. For example, when C2 is on, C1 is off, and vice-versa. |

Figure 10:
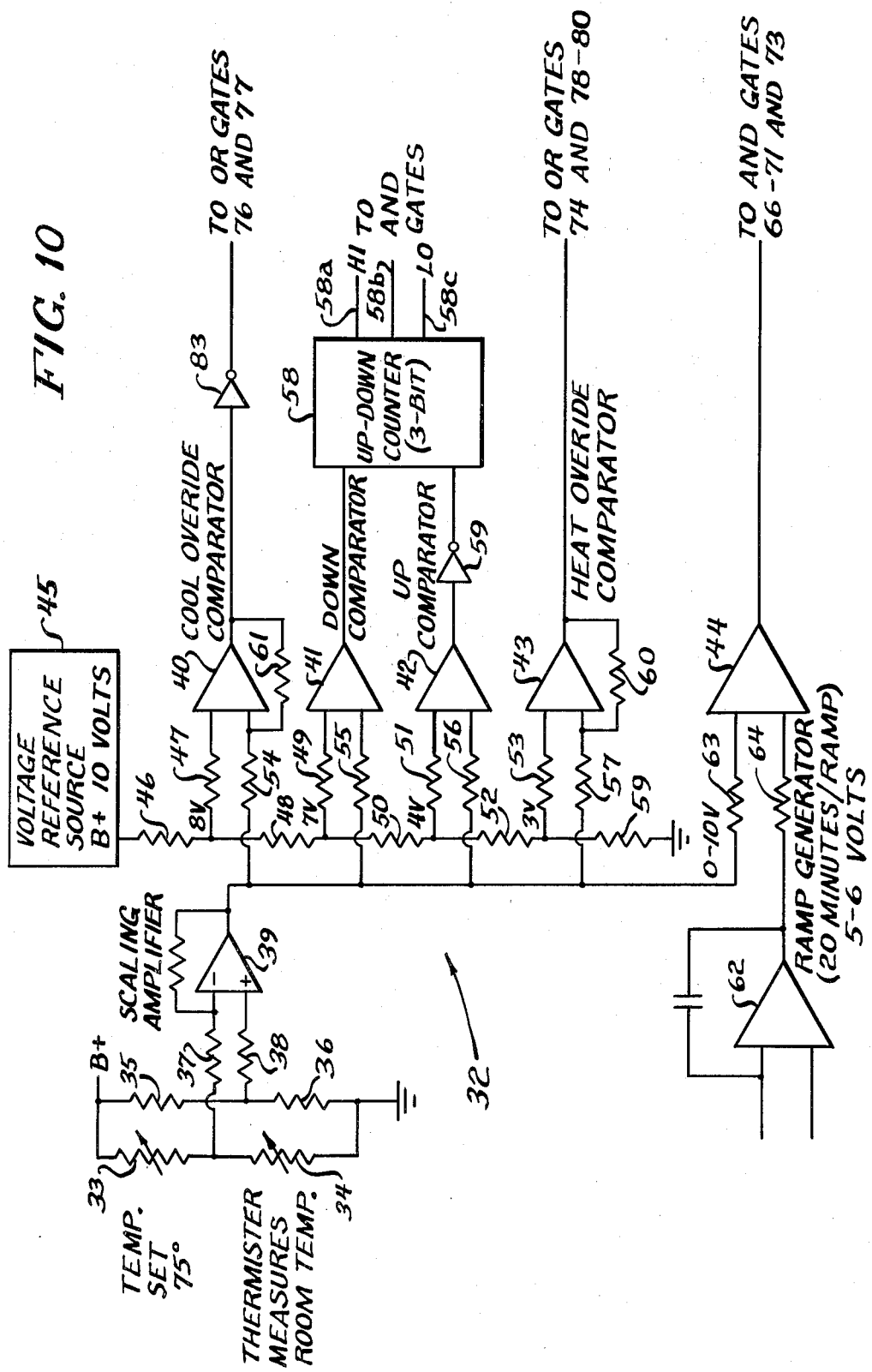
FIG. 10 is a block diagram depicting how the binary operation code of an electronic thermostatic system is generated to drive the logic diagram of FIG. 11.

FIG. 10 illustrates the analog and digital circuitry used to implement the multi-stage operation. A three digit binary number is produced by the circuit 32 and fed into the digital logic represented in FIG. 11.

Referring now to FIG. 10, a variable resistor 33 is preset for the desired temperature level of 75°. A thermistor 34 measures the actual room temperature. The signals produced by the variable resistor 33 and the thermistor 34 are reduced by resistors 35, 36, 37, and 38 and individually fed into scaling amplifier 39 to produce an output signal which is characteristic of the actual room temperature and which is characteristic of the actual room temperature and which has voltage in the range of 0-10 volts. The output signal from the scaling amplifier 39 is delivered to comparators 40-44.

Comparators 40-43 are arranged to provide a flash encoding method of analog-to-digital conversion. This method consists of a series of comparators whose outputs are either 1 or 0, depending on the analog input signal from the scaling amplifier 39. A reference voltage for each comparator is supplied by voltage reference 45 and a number of suitable resistor dividers 46-53. Each reference voltage is representative of a particular temperature. The reference voltage for cool override comparator 40 is 8 volts, which corresponds to the 78° temperature level. Similarly, the reference voltages for down comparator 41, up comparator 42, and heat override comparator 43 correspond to 77°, 73°, and 72°, respectively. The 73° and 77° levels are the "Add Heat" and "Delete Heat" trigger levels, and the 72° and 78° levels are the "Full On" and "Full Off" trigger levels.

The output analog signal from scaling amplifier 39 is divided by resistors 54-57 prior to being fed into comparators 40-43. The analog signal is then compared with each specific reference voltage fed into comparators 40-43. If the analog signal exceeds the reference voltage, a logic 0 output is generated. If the analog signal falls below the reference voltage, a logic 1 output is generated.

Up comparator 42 and down comparator 41 generate an operations code for implementing the various stages of the system. Output from down comparator 41 is fed directly into a conventional up-down counter 58. The output from up comparator 42 is inverted by inverter 59 before it is delivered to the up-down counter 58. A three-bit binary output is generated from the up-down counter 58. This binary number is then delivered to the circuitry illustrated in FIG. 11. The binary number generated by the up-down counter 58 represents a particular stage and is shown by the truth table of FIG. 9.

The heat override comparator 43 normally registers a logic 0 output when the house temperature is above 72° (a 3 volt signal) and a logic 1 output when the house temperature is below 72°. However, when a logic 1 output is already registered, the house temperature must rise to 74° (a 5 volt output signal from scaling amplifier 39) before the output from the heat override comparator 43 will flop back to a logic 0. This hysteresis effect on the heat override comparator 43 is produced by resistor 40.

The cool override comparator 40 operates in a similar manner. A logic 0 output is generated when the house temperature is above 78° (an 8 volt signal), and a logic 1 output is generated when the house temperature is below 78°. A hysteresis effect on the cool override comparator 40 is produced by resistor 61. When a logic 0 output is already registered as the output from the cool override comparator 40, the house temperature must fall to 76° (a 6 volt signal) before the output from the cool override comparator 40 will flop to a logic 1.

The output signal from the scaling amplifier 39 is also compared with a varying voltage signal from a ramp generator 62 at proportional control comparator 44. The signals from the scaling amplifier 39 and the ramp generator 62 are reduced for comparison purposes by resistors 63 and 64, respectively. Ramp generator 62 generates a sawtoothed signal having a twenty minute cyclic period. A 5 volt signal generated at the beginning of the cycle gradually increases over the twenty minute period to a 6 volt signal. The signal drops back down to the 5 volt level at the end of twenty minutes and the cycle is repeated. The 5-6 volt range corresponds to the 74°-76° temperature range.

The comparator 44 activates the particular heating source which is on proportional control. When the output signal from scaling amplifier 39 is below the varying voltage signal from the ramp generator 62, the comparator 44 registers a logic 1 output. Conversely, the comparator 44 registers a logic 0 output when the output signal from the scaling amplifier 39 is greater than the varying voltage signal from the ramp generator 62. As a result, the digital output of the comparator 44 changes at some point during each twenty minute cycle when the house temperature is in the 74°-76° range. Whenever the house temperature is outside the 74°-76° range, a constant logic is maintained.

Referring to both FIGS. 10 and 11, the three-bit digital output from the up-down counter 58 is selectively fed to AND gates 65-73. In addition, the pulse output from comparator 44 is delivered to AND gates 66, 67, 68, 70, 71, and 73. Selected inputs to the AND gates are provided with inverters for inverting the digital pulses from the up-down counter 58 and the comparator 44. These inverters are represented by the circles to the left of the AND gates.

The HI output from up-down counter 58 also delivered to OR gate 74 along with the output from heat override comparator 43. The resulting output from gate 73 controls the heat reversing valves 75 of the heat pumps HP1 and HP2.

The digital output from AND gates 65 and 66 along with the digital pulse from the cool override comparator 40 are fed to OR gate 76. The digital output from AND gates 67 and 68 along with the digital output from the comparator 40 are delivered to OR gate 77. In a similar fashion, the output from AND gates 69 and 70 and the output from the heat override comparator 43 are delivered to OR gate 78, and the output from AND gates 71 and 72 and the comparator 43 are delivered to OR gate 79.

The outputs from AND gate 73 and the comparator 43 are delivered to OR gate 80, which controls the electrical resistance heater H3. The outputs from OR gates 77 and 78 are fed to OR gate 81, which controls the compressor of heat pump HP1. Similarly, the outputs from OR gates 76 and 79 are delivered to OR gate 62 which controls the compressor of heat pump HP2.

Operation of Electronic Thermostat

The operation of the electronic thermostat and the cycling of the resources will be explained with reference to FIG. 12, which is a graph of time v. temperature similar to FIG. 2.

The up-down counter 58 is preset with an output of 011 when the system is initially activated at Time 0 (see FIG. 12). The output terminal 58a of the up-down counter which is designated HI in FIG. 10 is 0, the output terminal 58b is 1 and the output terminal 58c, which is designated LO, is also 1. The thermistor 34 (FIG. 10) measures the room temperature of 68°, and this measurement is fed into scaling amplifier 39 along with the desired preset temperature of 75° from the variable resistor 33. The scaling amplifier 39 converts this input into an output signal having a voltage between 0 and 10 volts, and the output voltage is representative of the actual temperature. The voltage signal is subsequently reduced by resistors 54–57 and 59 before it is fed into comparators 40–44. At comparators 40–43, this voltage signal is compared with a particular reference voltage which is supplied from the voltage reference source 45. Since the voltage signal from the scaling amplifier 39 does not exceed any of the reference voltages, the outputs of comparators 40–43 all register a logic 1. The voltage signal supplied to comparator 44 is compared with the varying 5 to 6 volt signal from ramp generator 63. Since the signal from scaling amplifier 39 is below 5 volts, the output from comparator 44 is also a logic 1.

The logic 1 output from the down comparator 41 is fed into the up-down counter 58. The logic output from the up comparator 44 is delivered to the inverter 59 and changed to a logic 0 before delivery to the up-down counter 58. Neither the logic 1 input from the down comparator 41 nor the logic 0 output from inverter 59 change the output of the up-down counter 58. In order for the up-down counter 58 to count down, a logic—input from the down comparator 41 must be followed by a logic 1. The three-bit digital code from the up-down counter 58 increases by one when a logic 1 from the inverter 59 is followed by a logic 0 input from the inverter 59. The logic 1 output from the cool override comparator 40 is delivered to the inverter 83, thereby flopping the digital pulse to a logic 0. This logic 0 output is delivered to OR gates 76 and 77.

The logic 0 output of the HI terminal of the up-down counter 58 and the logic 1 output from heat override comparator 43 are delivered to OR gate 74, thereby producing a logic 1 output which causes the reversing valves 75 of the heat pumps HP1 and HP2 to be positioned in the heating mode. The heat pumps HP1 and HP2 will therefore be operated as heat resources H1 and H2, respectively. The logic 1 output from heat override comparator 43 is delivered to OR gates 74, 78, 79, and 80. Simultaneously, the 011 output from the up-down counter 58 is selectively delivered to AND gates 65–73 while a logic 1 is delivered from the comparator 44 to AND gates 66, 67, 68, 70, 71, and 73. Some of the logic is inverted before entry into the AND gates, as noted above. This combination of inputs results in all AND gates 65–73 generating logic 0 outputs which are then fed to OR gates 76–80.

The logic 0 outputs from AND gates 65 and 66 combine with the inverted logic 0 output from the cool override comparator 40 to generate a logic 0 output at OR gate 76. Similarly, logic 0 outputs from AND gates 67 and 68 combine with the inverted logic 0 from the comparator 40 to register a logic 0 output or OR gate 77. On the other hand, the logic 0 outputs from AND gates 69 and 70, AND gates 71 and 72, and AND gate 73 combine with the logic 1 output from heat override comparator to generate logic 1 outputs at OR gates 78, 79, and 80. The logic 1 output from OR gate 80 activates the electric heater H3. The logic 1 output from OR gate 78 and the logic 0 output from OR gate 77 enter OR gate 81 to register a logic 1 output, and the logic 1 from OR gate 79 and the logic 0 from OR gate 76 enter OR gate 83 to generate a logic 1 output. The logic 1 outputs from OR gates 81 and 82 activate H1 and H2 respectively. Thus a "Full on Demand" level has been reached.

H1, H2, and H3 will remain activated to increase the house temperature until the voltage signal from the scaling amplifier 39 reaches the 5 volt level, which corresponds to 74° (see FIGS. 10 and 12). As the house temperature passes through the 72°, the outputs from comparators 40–44 remain the same. The hysteresis effect created by resistor 60 on the heat override comparator 43 prohibits the comparator's output from flopping to a logic 0.

At Time 11 in FIG. 12, the house temperature passes above the 73° level, causing the signal from the scaling amplifier 39 to exceed the 4 volt reference voltage at the up comparator 44. The up comparator 44 responds by registering a logic output 0, which is then inverted to a logic 1 by the inverter 59 and fed into the up-down counter 58. The three-bit code generated by the up-down counter 58 is not altered by this logic input. However, the counter 58 is now triggered to increase the three-bit binary output by one when the up comparator 44 next changes.

When the house temperature reaches 74° (Time 12), the scaling amplifier 39 transmits a 5 volt signal. This signal now exceeds the hysteresis level maintained on the heat override comparator 43, thereby causing the output comparator 43 to change to a logic 0. This logic 0 output is then delivered to OR gates 74, 78, 79, and 80. The outputs from these gates change to a logic 0 because the other inputs are also a logic 0. The logic 0 output from OR gate 74 switches the reversing valves 75 away from the heating mode. At the same time, all three heating sources are deactivated. The logic 0 from OR gate 80 turns off H3. The logic 0 outputs from OR gates 78 and 79 are delivered to OR gates 81 and 82, respectively, to produce logic 0 outputs which turn off H1 and H2.

The house temperature begins to decline with all heating sources deactivated. At Time 13, the house temperature passes below the 73° level, thereby reducing the signal from scaling amplifier 39 below 4 volts. Accordingly, the output from the up comparator 42 now registers a logic 1 which is then inverted to a logic 0 by the inverter 59 before being fed into the up-down counter 58. The change in input from a logic 1 to a logic 0 causes the counter 58 to count up by one and generate a 100 output (see FIG. 9).

The logic 1 output from HI terminal 58a causes OR gate 74 to register a logic 1 output and switch the reversing valves 75 back to the heating mode. In addition, the new three-digit code from the up-down counter 58 and the output from the proportional control comparator 44 are selectively delivered to AND gates 65–73. The proportional control comparator 44 registers a logic 1 output because the signal from scaling amplifier 39 remains below the 5–6 volt varying signal from generator 62. Only the output from AND gate 69 is altered to a logic 1 output. The other AND gates maintain a logic 0 output. The logic 1 output from AND gate 69 causes OR gate 78 and subsequently OR gate 81 to also register a logic 1 output, thereby activating H1. However, the heating capacity of H1 is not enough to maintain the desired 75° level, and the house temperature continues to decline.

At Time 14, the house temperature falls below the 72° level, and the signal from the scaling amplifier 39 consequently falls below 3 volts. The heat override comparator 43 registers a logic 1 output, thereby delivering logic 1 inputs to OR gates 78, 79, 80, and 83 and activating H2 and H3. H1 continues to remain turned on. The house temperature again begins to rise.

When the house temperature passes the 73° level (Time 15), the up comparator 42 registers a logic 0 which is inverted to a logic 1 by the inverter 59 and fed into the up-down counter 58. The logic 1 input does not changes the three-digit output from the counter 58 but prepares the counter to change the next time that the output from the up comparator changes. The house temperature continues to increase, and the 74° level is again reached (Time 16) causing the output from the heat override comparator 43 to change to a logic 0. This change affects only the outputs at OR gates 79, 80, and 82, which all flop to a logic 0. As a result, H2 and H3 are deactivated, while H1 remains on, and the temperature begins to decline.

At Time 17, the house temperature again passes through the 73° level, and the scaling amplifier 38 transmits a signal which does not exceed the 4 volt level. Consequently, the up comparator 42 registers a logic 1 which is inverted to a logic 0 by the inverter 59 and delivered to the up-down counter 58. The change in logic input from 1 to 0 increases the three-digit output from the counter 58 to 101. In the meantime, the proportional control comparator 44 contineus to register a logic 1 output. As shown in FIG. 9, H1 and H2 are both subject to proportional control when a 101 code is generated by the counter 58. However, only one source is capable of cycling at any one time. The new three-digit code changes the output from AND gate 69 back to a logic 0 while the output from AND gate 70 now registers a logic 1. These changes do not alter the output for any other gates, and H1 continues to be the only activated heat source. Thus, the house temperature continues to fall. The proportional control comparator 44 does not effectively cycle between H1 and H2 because the house temperature is below the 74°–76° range. Therefore, the output from the comparator 44 remains a logic 1.

As the house temperature further declines, it passes below the 72° level (Time 18). Once again, the output from heat override comparator flops to a logic 1 thereby activating H2 and H3 to run with the already activated H1. The output from the up comparator 44 is again reset to a logic 0 when the house temperature passes the 73° level (Time 19). H2 and H3 are again shut off as the house temperature reaches the 74° level (Time 20). When the temperature again falls through the 73° level (Time 21), the up comparator 42 will again register a logic 1 output which is inverted to a logic 0 by the inverter 59 and fed into the counter 58 to increase the three-digit output to 110. Consequently, AND gates 69 and 72 register a logic 1 output while the remaining AND gates register a logic 0 output. As a result, OR gates 78, 79, 81, and 82 register logic 1 outputs, thereby activating both H1 and H2. The house temperature again rises above the 73° level (Time 22), and the up comparator 42 registers a logic 0 output which is inverted to a logic 1 and fed into the up-down counter 58 without any affect on the heating sources. The temperature continues to rise past the 74° level (Time 23), whereupon proportional control comparator 44 becomes an active varying controller to cycle H2 and level off the house temperature at around 74.5°.

When the house temperature is below the varying 5–6 volt signal generated by ramp generator, the comparator 44 registers a logic 1 output. When the house temperature is above the varying signal, comparator 44 registers a logic 0 output. The logic output from the comparator 44 determines whether or not H2 is activated. Once the house temperature levels off, H2 is turned on for approximately 25% of each twenty minute cycle it takes the signal from ramp generator 62 to increase from 5 to 6 volts. H2 is turned off for the remaining 75% of the cycle. The on-off time percentages will vary accordingly to maintain a level as long as the outdoor temperature does not push the house temperature above or below the 74°–76° range. If this does occur, an appropriate stage will be selected to maintain a house temperature within the 74°–76° range.

It will be understood from the foregoing that if H1 and H2 are not sufficient to maintain the desired temperature, the three-digit output from the up-down counter 58 will increase to 111 the next time that the temperature falls below 73°. This will increase the output from the up-down counter to 111 and turn H1, H2, and H3 on (see FIG. 9). When the temperature rises above 74°, H3 will be cycled by the proportional control comparator 44.

As the outside temperature rises, the house temperature will increase until the temperature passes through the Full Off Demand level at 78° and all heating resources will be turned off. The input from the down comparator 41 to the up-down counter 58 is changed as the temperature rises past 77° and the three-digit output from the counter will decrease by one. This will change the operation of the system in accordance with the truth table of FIG. 9. Successive temperature rises through 77° will ultimately change the output of the HI terminal 58a of the counter to 0 and reverse the reversing valves 75. If the house temperature continues to rise the logic circuit will begin activating the cooling resources in accordance with the truth table. It is believed that the operation of the logic circuit is self-evident from the drawing and the foregoing detailed description of the heating system.

The set temperature of 75° has been used for illustration purposes only. The set temperature can be varied by the variable resistor 33 in FIG. 10. The output from the scaling amplifier 39 is a function of the difference between the set temperature and the actual temperature. A reduction in the set temperature of 5° from 75° to 70° will correspondingly lower the various temperature triggers by 5°, and the temperature will ultimately be controlled within the 69°–71° range.

While in the foregoing specification detailed descriptions of specific embodiments of my invention have been set forth for the purpose of illustration, it will be understood that many variations in the details given herein may be made by those skilled in the art without departing from the spirit and scope of the invention.

I claim:

1. A method of controlling a plurality of heating sources comprising the steps of:
   (a) selecting a set temperature at which it is desired to maintain the indoor temperature;
   (b) selecting an on temperature at which all heating sources will be turned on;
   (c) selecting an add heat temperature;
   (d) selecting an off temperature at which all heating sources which are not in a locked-on mode will be turned off;
   (e) turning all heat sources on when the indoor temperature is below the on temperature;
   (f) turning all heat sources off except a heat source which is in a proportional control mode and any heat source which is in a locked-on mode as the indoor temperature rises past the off temperature;
   (g) transferring one of the heat sources from an off mode to a proportional control mode if the indoor temperature falls past the add heat temperature;
   (h) proportionally controlling the heat source which is in the proportional control mode in order to try to maintain the indoor temperature adjacent the set temperature; and
   (i) transferring the heat source which is in the proportional control mode to a locked-on mode in which the heat source is turned on and transferring another heat source from an off mode to the proportional control mode each time the indoor temperature falls past the add heat temperature until all heat sources are on the locked-on mode.

2. The method of claim 1 in which the off temperature is the same as the add heat temperature.

3. The method of claim 1 including the steps of selecting upper and lower temperature limits for the proportional control mode which are above and below the set temperature, turning the heat source which is in the proportional control mode fully on when the indoor temperature is below the lower temperature limit and turning the heat source which is in the proportional control mode off when the indoor temperature is above the upper temperature limit and proportionally controlling the heat source which is in the proportional control mode when the indoor temperature is between the upper and lower temperature limits.

4. The method of claim 1 including the steps of selecting a delete heat temperature, and transferring the heat source which is in the proportional control mode to an off mode and transferring a heat source which is in a locked-on mode to the proportional control mode each time the indoor temperature rises past the delete heat temperature until all heat sources are on the off mode.

5. The method of claim 4 including the steps of selecting a second off temperature above the delete heat temperature, and turning all heat sources off if the indoor temperature rises past the second off temperature.

6. A method of controlling a plurality of cooling sources comprising the steps of:
   (a) selecting a set temperature at which it is desired to maintain the indoor temperature;
   (b) selecting an on temperature at which all cooling sources will be turned on;
   (c) selecting an off temperature at which all cooling sources which are not in a locked on mode will be turned off;
   (d) selecting an add cool temperature;
   (e) turning all cooling sources on when the indoor temperature is above the on temperature;
   (f) turning all cooling sources off except the cooling source which is in a proportional control mode and any cooling source which is in a locked-on mode if the indoor temperature falls below the off temperature;
   (g) transferring one of the cooling sources to a proportional control mode if the indoor temperature rises past the add cooling temperature;
   (h) proportionally controlling the cooling source which is in the proportional control mode in order to try to maintain the indoor temperature adjacent the set temperature;
   (i) transferring the cooling source which is in the proportional control mode to a locked-on mode in which the cooling source is turned on and transferring another cooling source to the proportional control mode each time the indoor temperature rises above the add cool temperature until all cooling sources are in the locked-on mode.

7. A method of controlling a heat pump and a second heat source, the heat pump being capable of operating as a first heat source and as a cooling source, comprising the steps of:
   (a) selecting a set temperature at which it is desired to maintain indoor temperature;
   (b) selecting an on temperature at which both heating sources will be turned on;
   (c) selecting an add heat temperature below the set temperature;
   (d) selecting a first heat-off temperature;
   (e) selecting a delete heat temperature above the set temperature;
   (f) selecting a second heat-off temperature above the delete heat temperature;
   (g) turning both heat sources on when the indoor temperature is below the on temperature;
   (h) turning both heat sources off if the indoor temperature is above the second heat-off temperature;
   (i) transferring one of the heat sources from an off mode to a proportional control mode if the indoor temperature falls past the add heat temperature;
   (j) proportionally controlling the heat source which is in the proportional control mode in order to try to maintain the indoor temperature adjacent the set temperature;
   (k) transferring the first heat source to a locked-on mode and transferring the second heat source from an off mode to the proportional control mode if the indoor temperature falls past the add heat temperature when the first heat source is in the proportional control mode;
   (l) turning any heat source which is not in a locked-on mode or in the proportional control mode to an off mode when the indoor temperature rises above the first heat-off temperature;
   (m) when the temperature rises past the delete heat temperature:
      (1) if the second heat source is in the proportional control mode, then transferring the second heat source to an off mode and transferring the first heat source to the proportional control mode;
      (2) if the first heat source is in the proportional control mode, then transferring the first heat source to an off mode;
      (3) if neither heat source is in the proportional control mode, then operating the heat pump as a cooling source.

* * * * *